No. 874,037. PATENTED DEC. 17, 1907.
E. G. SCHREIBER.
POTATO PLANTER.
APPLICATION FILED SEPT. 11, 1907.

2 SHEETS—SHEET 1.

Witnesses:
D. A. Paulenschmidt
Walter M. Fuller

Inventor:
Ernst G. Schreiber
By Offield, Towle & Linthicum
Attys

No. 874,037. PATENTED DEC. 17, 1907.
E. G. SCHREIBER.
POTATO PLANTER.
APPLICATION FILED SEPT. 11, 1907.
2 SHEETS—SHEET 2.
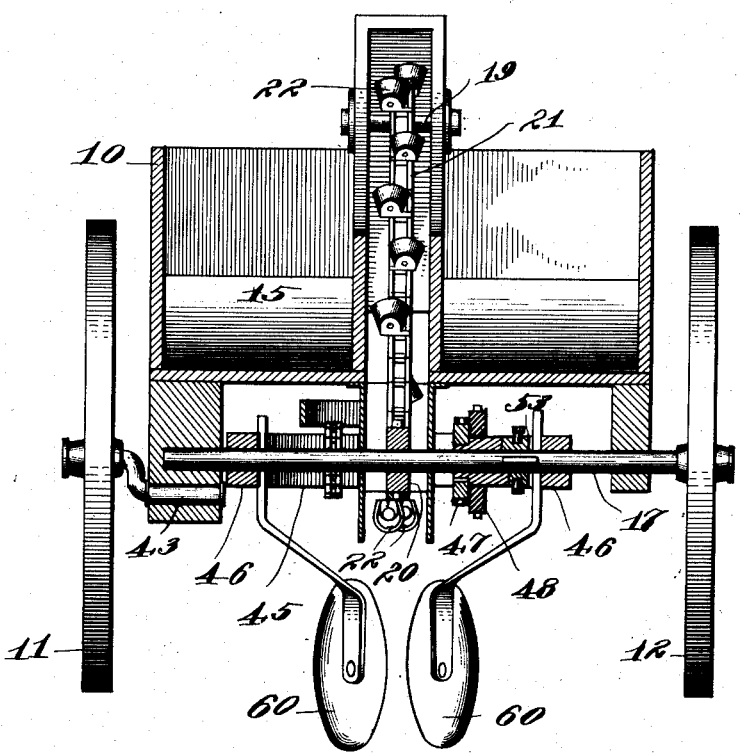
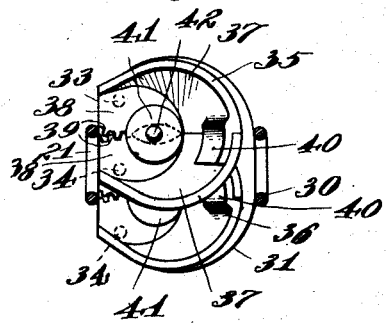
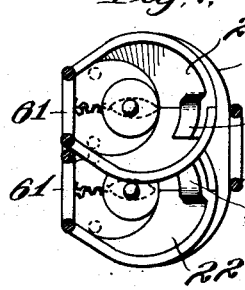
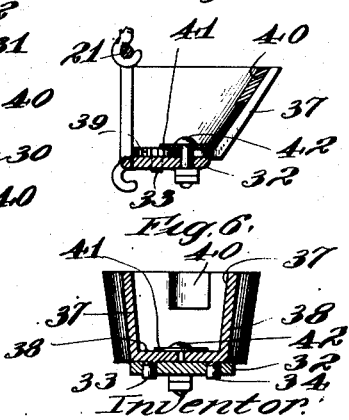

UNITED STATES PATENT OFFICE.

ERNST G. SCHREIBER, OF HAMMOND, INDIANA.

POTATO-PLANTER.

No. 874,037.        Specification of Letters Patent.        Patented Dec. 17, 1907.

Application filed September 11, 1907. Serial No. 392,345.

*To all whom it may concern:*

Be it known that I, ERNST G. SCHREIBER, a citizen of the United States, residing at Hammond, in the county of Lake and State of Indiana, have invented certain new and useful Improvements in Potato-Planters, of which the following is a specification.

My invention relates to potato planters or similar devices, and has for its object and aim the improvement of the potato feeding and delivering mechanism.

Preferably my machine is supplied with one or more feeding chains to each of which is fastened a plurality of buckets or cups each adapted to receive a single piece of potato as it passes through the wagon body or compartment containing the supply of cut potatoes. In order that these cups or buckets may be readily filled by the pieces or fragments of potatoes during their transit through the wagon body, if I employ a single chain, I prefer to have the buckets or cups mounted thereon in staggered relation. Since the pieces of different kinds, grades, or qualities of potatoes vary somewhat in size, it is desirable to be able to adjust or vary the capacity or mouth opening of each of the buckets or cups so that under no circumstances will any one receive and hold more than a single piece. To carry out this idea I have made each of the buckets of two parts, each section being pivoted and having gear teeth meshing with those of the other. The turning of either part on its pivot correspondingly turns the other, whereby an adjustment in the capacity or size of the bucket may be secured without varying the position of the bucket as a whole, and I also provide means for maintaining the parts or sections of the buckets in adjusted position. Besides the feeding chain or chains with their buckets or cups, I use a delivery chain with similar receptacles or pockets which convey the pieces of potato downwardly and deliver them near the ground after having received them from the buckets or cups of the feeding chain or chains. By employing a construction of this character the pieces of potato are delivered more uniformly and exactly than if they were allowed to drop from the buckets of the feeding chain, because they are delivered or dropped comparatively near to the ground.

Figure 1:
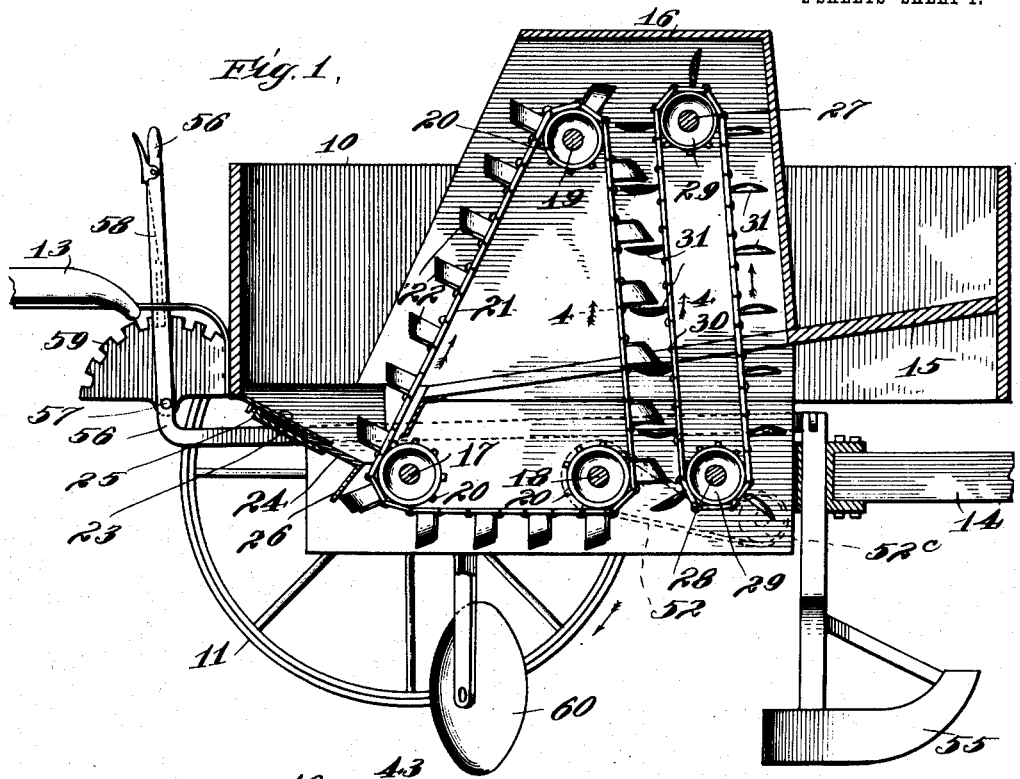
Figure 2:
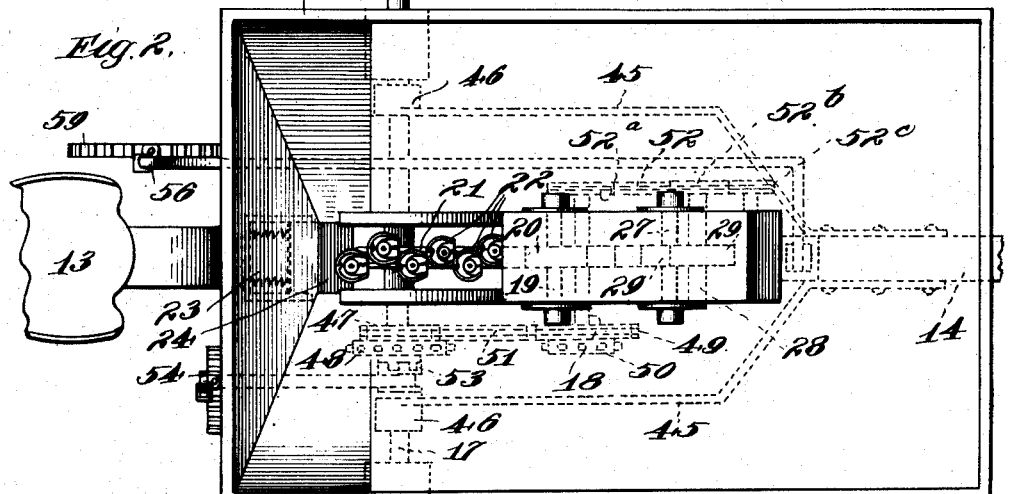

I have illustrated my preferred and most desirable embodiment of the invention on the accompanying drawings, on which Figure 1 is a substantially-central vertical longitudinal section through the machine, the seat and pole or tongue being partly broken away; Fig. 2 is a plan view of the machine, one wheel being omitted; Fig. 3 is a vertical cross-section adjacent to the axle; Fig. 4 is a section on line 4—4 of Fig. 1 on an enlarged scale looking in the direction indicated by the arrows; Figs. 5 and 6 are detail sectional views of the feeding chain and buckets; and Fig. 7 is a view similar to Fig. 4 and shows a modified arrangement of the buckets when a plurality of feeding chains is employed.

The machine illustrated on the drawings comprises a wagon body or supply compartment 10, a pair of carrying wheels 11 and 12, a seat 13, and a tongue or pole 14. The body 10 has a rearwardly-inclined bottom or floor 15 which directs the pieces of cut potato to the rear end of the body where they may be caught by the cups of the feeding chain and elevated, as is obvious. Within or passing through an upstanding hood or shield 16 are a main axle 17 and a pair of transverse rotatable shafts 18 and 19, each being provided with a sprocket wheel 20, the wheel on the axle being free to rotate thereon. Passing around these three sprocket wheels is a sprocket chain 21 provided with a plurality of buckets or cups 22 each of which is adapted to receive or pick up a piece of potato as it passes upwardly within the shield. The rear inclined wall 23 at the back end of the wagon body is supplied at its lower end with a sliding gate or valve 24 pushed downwardly by a spring 25. At its lower end the gate or valve 24 has a depending lip 26 which is engaged by the buckets as they pass around the sprocket wheel 20 on axle 17, and is temporarily pushed upwardly to allow the buckets to pass into the body of the vehicle. As is obvious, the object of this gate or valve is to prevent the pieces of potato from escaping through the opening which must necessarily be provided for the entrance of the buckets into the wagon body.

In the forward part of the shield or hood 16 I provide a pair of shafts 27 and 28 each equipped with a sprocket wheel 29 around which passes a substantially-vertical delivery chain 30 supplied with a number of saucer-shaped receptacles or pockets 31 adapted to receive the pieces of potato as they are dropped from the buckets or cups 22 when they turn around the top shaft 19. As is clearly illustrated in Fig. 1, the saucer-like receptacles 31 are located on the chain 30 so as to come between the buckets 22 as they descend on the substantially-vertical front stretch or length of the chain 21. In order to facilitate the filling of the buckets 22 with the pieces of potato during their upward travel on the back inclined stretch of the chain 21 in the wagon-body, they are mounted on the chain in staggered relation, as is clearly shown in Figs. 2, 3 and 4, and the receptacles 31 which face upwardly on the rear stretch of chain 30 are made sufficiently large to receive the pieces of potato delivered thereto from all of the cups or buckets 22.

Each link of the chain 21 which is provided with one of the buckets or cups has an outwardly-extended platform or shelf 32 to which is pivoted at 33 and 34 the two halves or parts 35 and 36 of the bucket, each part having a flared side wall 37 and a flat bottom 38, the two parts 38 of the pair of companion sections of the bucket being supplied with a few intermeshing gear teeth 39. As is illustrated, the part 35 of the bucket has a lip 40 which internally overlaps the adjacent portion of the part 36 and helps maintain the parts in proper relation. It will be obvious that with this construction the turning of either part of the bucket on its pivot correspondingly rotates the other part on its pivot, thereby rendering the adjustment uniform for both halves of the bucket. In order to hold the sections of the pockets or buckets in adjusted position, I provide the floor or bottom wall with a washer 41 which overlaps the parts 38, and bolt or screw this washer to the platform or shelf 33 by means of a screw or bolt 42.

The wheel 11 is rotatably mounted on an adjustable cranked axle 43, while its companion wheel 12 is fixed to the straight shaft or axle 17 suitably mounted in bearings of the wagon frame. As is illustrated in dotted lines in Fig. 2, the tongue 14 is connected to the axle 17 by a pair of bent bars 45 having hubs 46 at their rear ends surrounding the axle. Loosely mounted on the axle 17 so as to be capable of rotation thereon is a pair of sprocket wheels 47 and 48 of different sizes rigidly secured together. The shaft 18 at one end is equipped with a pair of sprocket wheels 49 and 50 in alinement with the pair 47—48 and a sprocket chain 51 which may be made to coact with either of the pair of sprocket wheels and transmit the rotation of gear 47 and 48 to the shaft 18, thereby causing the proper movement of the feeding chain 21 and its buckets. A sprocket chain 52 passes around a sprocket wheel 52$^a$ on the opposite end of shaft 18 (Figs. 1 and 2), beneath a similar wheel 52$^b$ on the adjacent end of shaft 28 and around an idler 52$^c$. By this means shaft 28 and its sprocket wheel 29 are revolved, thereby causing the proper travel of chain 30 and its pockets or receptacles 31. A clutch element 53 keyed to and slidable on the axle 17 and controlled by the handle 54 near seat 13 may be thrown into and out of operative relation with the pair of gears 47, 48 loosely mounted on the axle so that the chains may be made to travel or not, as the operator desires.

A furrow opener or small plow 55 is mounted on the machine in front of the delivery chain 30 and is connected at its upper end to a bell-crank lever 56 pivoted at 57 and supplied with a locking dog 58 which may be thrust into or removed from any one of the notches of an adjacent segment 59 to maintain the opener 55 at the proper height. Back of the chain 30 the two-wheeled machine has a pair of covering disks 60 suitably supported and adapted to cover the pieces of potato with earth after they have been delivered by the receptacles 31 of chain 30 into the furrow opened by the opener 55.

It will be readily understood that the body 10 of the planter is filled with pieces of cut potatoes of substantially uniform size, and that with the clutch element 53 thrown into operative relation with the sprocket wheels on the axle the feeding and delivering chains 21 and 30, respectively, are caused to travel around their shafts and sprocket wheels, the buckets or cups 22 as they enter the bottom of the body pushing back the valve or gate 24 and each being filled with a single piece of potato, which is carried upwardly around the shaft 19 and then dropped into one of the receptacles or pockets 31 of shaft 30 which conveys it downwardly and drops it near the earth into the furrow. If a different kind or grade of potato is to be used so that the pieces are of different size from what the buckets are adjusted to receive, it may be necessary to adjust the parts of the buckets or cups 22 so that each will take up only one piece of potato as it passes through the reservoir or supply of cut potatoes in the wagon body. A variation in the speed of feed and delivery may be secured by shifting chains 51 and 52 to the other pairs of coöperating sprocket wheels.

Instead of having the buckets 22 on a single chain 21 staggered as is shown in Figs. 2, 3 and 4, I may use two sprocket chains 61 arranged side by side each supplied with a plurality of unstaggered cups or buckets 22. Owing to the fact that such cups or buckets are arranged in alternation on the pair of feeding chains 61, the effect of staggered buckets on a single chain is secured (see Fig. 7). As in the previous instance, the saucers or receptacles 31 are made large enough to receive the pieces of potato delivered to them from any of the buckets 22 on the two feeding chains.

Although in some adjusted positions of the parts of the cups or buckets 22 there may be a gap or opening between the adjacent walls 37 of the two parts below the lip 40, this opening does no harm since it is not large enough to permit the escape of the pieces of potato held in the bucket.

Various minor mechanical changes may be made in the structure shown and described without departure from the substance of my invention and without sacrificing its benefits and advantages, since my invention is not limited to the precise structural features and details shown and described.

I claim:

1. In a potato planter or similar device, the combination of a compartment adapted to contain pieces of potato, a feeding chain, and buckets or cups on said chain each adapted to pass into said compartment and receive or pick up a piece of potato, said buckets or cups being staggered to facilitate their filling by the pieces of potato, substantially as described.

2. In a potato planter or similar device, the combination of a compartment adapted to contain pieces of potatoes, a feeding chain, buckets or cups on said chain each adapted to pass into said compartment and receive or pick up a piece of potato, and a delivery chain carrying pockets or receptacles adapted to receive pieces of potato from the buckets or cups of said feeding chain and deliver them near the ground, substantially as described.

3. In a potato planter or similar device, the combination of a compartment adapted to contain pieces of potatoes, a feeding chain, buckets or cups on said chain each adapted to enter said compartment and receive or pick up a piece of potato, said buckets or cups being staggered to facilitate their filling by the pieces of potato, and a delivery chain carrying pockets or receptacles adapted to receive the pieces of potato from the buckets or cups of said feeding chain and deliver them near the ground, substantially as described.

4. In a device of the character described, the combination of a compartment adapted to contain a plurality of articles, a feed chain, and buckets or cups on said chain each adapted to pass into said compartment and receive or pick up one or more of said articles, said buckets or cups being staggered to facilitate their filling by said articles, substantially as described.

5. In a device of the character described, the combination of a conveyer, one or more conveying buckets or cups mounted on and movable with said conveyer, the size of the mouths of said buckets or cups being adjustable, and means to maintain the adjustment of said buckets or cups, substantially as described.

6. In a device of the character described, the combination of a conveyer and one or more conveying buckets or cups mounted on and movable with said conveyer, each of said buckets or cups comprising a plurality of pivoted parts adapted to be turned on their pivots to vary the capacity of the bucket or cup, and means to hold said parts in adjusted position, substantially as described.

7. In a device of the character described, the combination of a conveyer and one or more conveying buckets or cups mounted on and movable with said conveyer, each of said buckets or cups comprising a pair of pivoted parts geared together, whereby the capacity or size of the buckets may be varied, and means to hold said parts in adjusted position, substantially as described.

8. In a device of the character described, the combination of a conveyer and one or more conveying buckets or cups mounted on and movable with said conveyer, each of said buckets or cups comprising a pair of pivoted parts, the capacity or size of the buckets being adjustable by turning said parts on their pivots, and a lip on one of said parts overlapping the other, substantially as described.

9. In a device of the character described, the combination of a conveying chain having an outstanding ledge or shelf, and a bucket or cup mounted on said ledge or shelf, said bucket or cup comprising a pair of parts pivoted on said ledge or shelf and each having gear teeth meshing with those of the other, a washer overlapping the bottom walls or floors of said parts, and a screw threaded member securing said washer to said ledge or shelf, substantially as described.

ERNST G. SCHREIBER.

Witnesses:
    FREDERICK C. GOODWIN,
    WALTER M. FULLER.